United States Patent [19]

Kelleher

[11] 4,418,363
[45] Nov. 29, 1983

[54] VIDEO DISC PLAYER WITH RFI REDUCTION CIRCUIT INCLUDING SYNC TIP CLAMP

[75] Inventor: Kevin C. Kelleher, Plainfield, Ind.

[73] Assignee: RCA Corporation, New York, N.Y.

[21] Appl. No.: 276,898

[22] Filed: Jun. 24, 1981

[51] Int. Cl.³ .............................................. H04N 5/94
[52] U.S. Cl. .................................. 358/336; 360/38.1;
455/296; 358/340; 358/167; 358/177
[58] Field of Search ............... 360/38.1; 358/314, 315,
358/335, 336, 340, 167, 177, 178, 342; 455/296,
303, 308

[56] References Cited

U.S. PATENT DOCUMENTS

| | | | |
|---|---|---|---|
| 3,605,018 | 9/1971 | Coviello | 455/302 |
| 3,671,867 | 6/1972 | Schwarz | 455/296 |
| 4,203,134 | 5/1980 | Christopher | 358/314 |
| 4,327,431 | 4/1982 | Dieterich | 358/340 |
| 4,327,432 | 4/1982 | Lang | 358/340 |
| 4,328,591 | 5/1982 | Baghdady | 455/303 |
| 4,361,881 | 11/1982 | Clemens | 369/126 |
| 4,364,119 | 12/1982 | Gibson | 360/38.1 |

Primary Examiner—Alan Faber
Attorney, Agent, or Firm—Eugene M. Whitacre; Joseph S. Tripoli; William H. Meise

[57] ABSTRACT

Under certain conditions a video disc player can be responsive to externally applied interference signals to provide a defect in the display of the information recovered from the disc. Apparatus is provided which reduces the influence of the extraneous signal in the playback display. The apparatus includes a detection threshold level setting circuit which relies on the amplitude of the recovered signal during the recurring sync signals to establish the threshold at which corrective action will be taken in the player.

6 Claims, 3 Drawing Figures

VIDEO DISC PLAYER WITH RFI REDUCTION CIRCUIT INCLUDING SYNC TIP CLAMP

The present invention relates generally to video disc players and more particularly to video disc players having radio frequency interference reduction apparatus.

In certain types of video disc players, such as, for example, capacitive pickup video disc players, the signal pickup circuitry includes an oscillator operating in conjunction with a tuned circuit and peak detector. An example of such pickup circuitry may be found in U.S. Pat. No. 4,080,625 issued to H. Kawamoto et al. on Mar. 21, 1978. The oscillator frequency in such systems is generally set at a value falling within the ISM (industrial, scientific, medical) allocation band, for example, 915 MHz. The power output of this oscillator at 915 MHz is usually low and does not generally represent a significant problem in terms of r.f. radiation outward. However, there are certain types of equipment which operate at high power levels in the ISM band, such as radars for example, and, if a number of conditions are met (such as frequency, power level, directivity and location, etc.) these outside sources of radiation can have an adverse effect on the playback operation of the video disc system.

This undesirable mode of operation appears to manifest itself in the following way. When an outside source is radiating at levels which are higher than those anticipated by the pickup circuit detector in normal player operation, the extraneous detected output signal is supplied to an FM detector which locks onto the extraneous signal. The extraneous signal is then demodulated and passed through the player signal processing circuits and displayed on the television receiver. If the extraneous signal is a pulse of short duration, say two microseconds, then the demodulated version may appear on the output television display as a short interval of black or white on a horizontal line. This results from the fact that in FM systems of the type under consideration detection of high carrier frequencies is decoded as tending toward "white" level signals and detection of low carrier frequencies is detected as tending toward "black" level signals. These short duration interference signals may be noticeable to the discerning eye.

When the external source is of greater duration, say 125 microseconds, the effect is much more noticeable in the output display. Since one television horizontal line in the NTSC format is about 63 microseconds long, a condition may arise wherein two lines of the display will be white or black. Now if the outside source is a periodic type source, then two lines of the display will show up incorrectly on a corresponding periodic basis. This is noticeable even more than the previously mentioned situation.

There are various combinations of outside source power levels and durations which may produce other undesirable results in the final display such as a combination of light and dark spots on one or more horizontal lines of the display and even picture rolling if the FM demodulator falsely locks on to an extraneous signal when the vertical synchronization signal should normally be detected. In respect of all of the above identified display problems, it is desirable to provide a means to at least reduce the effects of the interference to a level which most observers would not even notice. Again, it should be noted that the problems mentioned arise only under a certain set of conditions.

In a patent application filed on Nov. 7, 1980 in the names of F. B. Lang and J. K. Clemens, Ser. No. 204,828; now U.S. Pat. No. 4,327,432 a solution to the above situation is presented.

The Lang et al. invention provides a means for reducing the effects of outside radio frequency interference (RFI) in the operation of a video disc player of the type which includes a pickup circuit means coupled to an FM demodulator. The FM demodulator passes the FM detected signal to a defect compensation means which includes a defect switch and a delay line. The FM demodulator is also coupled to a defect detector which senses normal defects, that is, when the FM carrier deviation is beyond certain deviation limits. The normal operation of the defect compensation means is to recirculate and reprocess a previous line of demodulated information when the defect detector operates the defect switch. In accordance with the Lang et al. invention, a radio frequency interference reduction circuit is connected between the output of the pickup circuit means and the defect switch. The RFI reduction circuit, in one embodiment, comprises an amplifier, coupled to a detector, which in turn is connected to two conduction paths. The two conduction paths are connected to a differential signal comparator circuit. One of the two paths is a wideband path and the other path includes a low pass filter which does not pass abrupt changes in the signal provided at the output of the pickup circuit. Either one of the paths may have a d.c. offset voltage applied thereto. The net effect is that the differential input to the comparator provides an output in response to rapid amplitude variations in the output signal of the pickup circuit. When such a situation is detected, the comparator provides a signal to the defect switch, through an OR function circuit, to cause recirculation of a previously detected line of information for the duration of the detected defect. The OR circuit is used so that the recirculation may be accomplished for either the abnormal carrier deviations caused by disc defects or the abnormal occurrence of a detected extraneous outside signal.

Another patent application was filed on Nov. 7, 1980 in the names of C. B. Dieterich and F. B. Lang, Ser. No. 204,827 now U.S. Pat No. 4,327,431, wherein a system of the Lang et al. type was presented with the addition of a variable offset voltage in one of the two paths.

In a patent application filed on Nov. 21, 1980 for J. K. Clemens, Ser. No. 208,984, an approach is taken wherein the signal from the pickup means is subtractively combined with a limited version of the same signal to enhance the ability to detect the extraneous signal. In still another patent application filed on Nov. 21, 1980 in the name of J. J. Gibson, Ser. No. 208,982 now U.S. Pat. No. 4,364,119, the signal from the pickup means is mulltiplied with the signal from the limiter as another approach to detection.

Another approach, which is different from all of the above approaches, is taught by Kelleher in an application for patent Ser. No. 210,975 filed on Nov. 21, 1980 now U.S. Pat. No. 4,385,374. The primary focus of the aforementioned Kelleher invention is on strong or high amplitude extraneous pulse type signals which might capture the FM demodulator of the video disc player. In a player of the type previously described the aforementioned Kelleher invention utilizes an AGC amplifier responsive to the signal provided from the pickup apparatus. The output signals from the amplifier are applied to a peak detector circuit. The peak detector circuit is arranged to have a long term average response and, at the same time, a short term peak level response. The long term response is used to control the gain of the AGC amplifier and the short term response is used to control a threshold device which when activated provides a control signal. The control signal which is, in essence, generated as a result of the presence of the extraneous signal at a certain amplitude level can be used to operate the normal defect compensation apparatus present in the player.

The present approach to the problem of responding to extraneous signals recognizes a particular problem related to the video disc system of the type described above. In order to avoid false triggering or detection due to incidental AM introduced on the recovered FM video carrier resulting from the non-uniform response of the arm-stylus, the detection threshold is typically set at a high value. That is, the capacitive pickup stylus comprises a dielectric body (e.g., diamond) having an electrode on one side. (See, for example, U.S. Pat. No. 4,162,510 issued to Keizer.) As a result of the stylus electrode being slightly off the disc surface and the fact that the distance between the bottom edge of the electrode and the disc surface changes under varying conditions of playback as well as with stylus wear, there can be some slight "defocussing" of the pickup arrangement. This causes incidental AM to be detected by the pickup circuits along with the normally recorded signal.

This incidental AM component is variable with the condition of the stylus. Therefore, it was also difficult to select an optimum detection threshold level.

When the prior approaches set their detection thresholds high enough to avoid taking corrective action due to incidental AM, then it became possible to miss the detection of relatively low level interference signals which could cause disturbances in the visual display.

In the video disc player described in the present and previous applications, the signal recorded on the disc is a frequency modulated 5 MHz carrier. Black level of the video signal causes zero deviation of the carrier, or a frequency of 5 MHz. Sync tips cause the video frequency carrier to deviate to 4.3 MHz. Peak white in the video signal causes the video carrier to deviate to 6.3 MHz. Since the high frequency deviation corresponds to closer spacing of signal elements on the record, it turns out that the amplitude of the recovered signal is greater at the sync tip level corresponding to a deviation of 4.3 MHz as compared to the detected signal at 6.3 MHz. Therefore, it is expected that the recovered signal will have its highest amplitude during the horizontal sync interval.

The present invention utilizes these conditions in that the amplitude of the recovered signal during the horizontal sync interval is used as a reference level and the system detects signals in excess of this level as interference signals. The peak level of incidental AM is therefore fixed at a point slightly below the detection threshold and an optimum threshold is continuously maintained despite stylus variations (such as those occurring from wear).

In accordance with the present invention, the RFI circuitry is connected between the pickup circuit means and the defect switch, just as in the previously mentioned approaches. The present approach comprises amplifier means connected to the pickup circuit means. The signals from the amplifier means are provided to a signal limiter and to a product generator means. The product generator multiplies the limited signal and the amplifier means output signal to provide a signal to an amplitude detector means. The detected signal is provided to an output signal means. A signal clamping means responds to recovered synchronization signals to condition the output means to provide an output signal only when the detected signal exceeds a certain amplitude level related to the amplitude of the recovered synchronization signal.

A detailed description of a preferred embodiment of the present invention is shown in the drawing in which.

Figure 1:
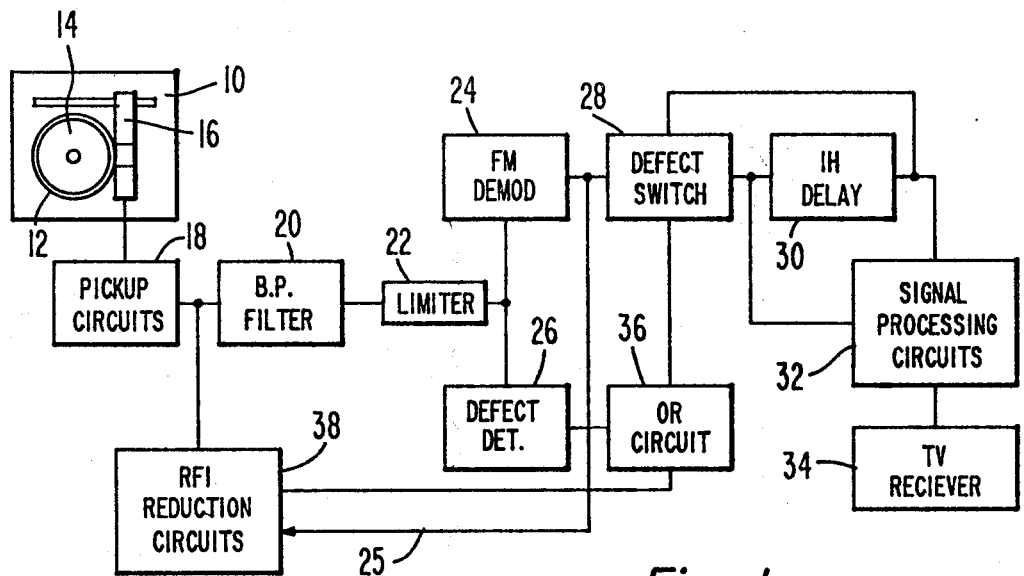
FIG. 1 is a block diagram representative of a video disc player including an RFI reduction circuit.

In FIG. 1, a video disc player 10 is shown including a turntable 12 for supporting a video disc record 14 of the capacitance type. The player 10 also includes a carriage 16 which carries a pickup cartridge therein. Typically, the carriage moves in a timed relation to the speed of rotation of turntable 12 during playback.

Electrically coupled to the cartridge in the carriage 16 are the pickup circuits 18 of the general type described in the Kawamoto patent. Although shown as a box separated from the carriage 16, these circuits are preferably housed in the carriage. As described in Kawamoto, the output signal from pickup circuitry 18 is a frequency modulated signal. This signal is bandpass filtered at 20. The signal at the output of filter 20 corresponds to the video information recorded on the disc. The video is recorded on a 5 MHz carrier with the black level causing zero deviation, sync tips at 4.3 MHz and peak white at 6.3 MHz. The FM audio carrier is at 716 KHz with a deviation of plus and minus 50 KHz. For purposes of discussing the present invention, only the video signal path will be considered and thus the bandpass filter 20 only passes the video frequencies of interest. The video signal is limited in limiter 22 to provide an appropriate signal to the FM demodulator 24 and defect detector 26.

FM demodulator 24 is a phase-locked-loop type and defect detector 26 is a latching comparator type. Both of these devices are of the type disclosed in U.S. Pat. No. 4,203,134 issued to T. J. Christopher et al. on May 13, 1980. The Christopher et al. patent also described the function and operation of the defect switch 28, the 1H delay line 30 and the signal processing circuits 32 for providing a signal for display on the TV receiver 34. For an even more detailed description and explanation of the function and operation of elements 30 and 32 reference should be made to U.S. Pat. No. 4,195,309 issued to T. J. Christopher et al. on Mar. 25, 1980.

In general terms, the circuit of FIG. 1 thus far described performs as follows. The pickup circuits 18 provide a frequency modulated signal which is filtered at 20 to develop the video FM signal which is then limited at 22. In the FM demodulator 24, the phase of the recovered signal is compared to that of a voltage controlled oscillator (VCO) to develop a signal which when low pass filtered provides a demodulated version of the video information. Demodulated video including luminance, chrominance and synchronization signals is available on line 25 and is utilized in the RFI reduction circuit in the manner to be described herein. The defect detector 26 compares the recovered signal with the output of the VCO in the demodulator 24 and when the phase of the recovered signal is out of a certain range relative to the VCO signal, a defect indication pulse is generated and provided through circuitry which includes an OR function 36. The OR function may be part of the existing circuitry of the player and in actual practice only a circuit point may be required to achieve the OR function. A defect signal coupled via the OR circuitry 36 is used to operate the defect switch 28. When operated, switch 28 causes information signals which were previously recovered to be re-used by passing signals coupled from the output of the 1H delay line 30. The recirculation or re-use of previously recorded information continues for as long as the switch 28 is held in the re-use position.

The arrangement of FIG. 1 further comprises a radio frequency interference reduction apparatus 38 which may comprise several circuit functions. RFI reduction apparatus 38 is electrically connected between the pickup circuits 18 and the input terminal of the OR circuit 36. Apparatus 38 could be connected to the output of filter 20 since the filtered signal includes the information used in the operation of the RFI reduction scheme. Apparatus 38 is used to detect anomalous signals from outside sources, as discussed above, and develop an appropriate signal which will activate the defect switch 28, via the OR circuit 36. By so doing, apparatus 38, in cooperation with the other elements mentioned, causes previously recovered information to be recirculated through switch 28 so that instead of seeing white or black lines appearing across the display, something more like that which should appear will be displayed. In most cases, the substitution of one line or less as described above cannot be noticed by the general observer. Even the substitution of the same line twice in a sequence, which is on the order of a 125 microsecond defect, is barely noticeable to most observers.

It will be recalled that the output signals from the defect detector 26 and the RFI reduction apparatus 38 are OR'ed at 36. It is desired to have the normal defect detection and substitution take place in the usual fashion so that out of band deviations due to signal defects are handled in the usual way. At the same time, when an outside signal gets picked up the system should see this and respond in an appropriate fashion.

Figure 2:
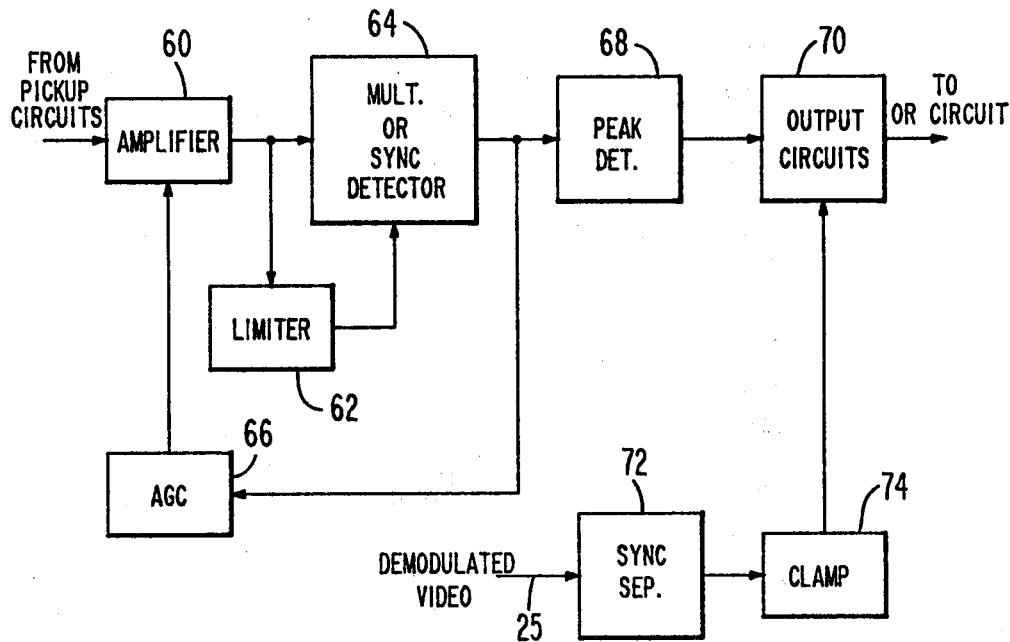
FIG. 2 is a block diagram of the RFI reduction circuit in accordance with the present invention.

FIG. 2 shows a block diagram of a system which corresponds to the RFI reduction circuits 38 of FIG. 1. In FIG. 2 the signal recovered from the record, which may include the incidental AM and possibly an extraneous unrecorded signal, is provided to an amplifier 60. The amplified signal is coupled to a limiter 62 and to a product generator 64 which may be a multiplier or a synchronous detector. Product generator 64 multiplies the limited signal with the amplified signal to produce an output signal which has: a D.C. component proportional to the average signal level; a component proportional to the amount of incidental AM; a positive going pulse proportional to the power of the extraneous interference pulse; and an AC component at the difference frequency between the video carrier and the interfering pulse. The aforementioned Gibson application provides even more details from a spectral point of view as to the operation of multiplying the limited signal with the amplified signal.

The D.C. component is used to operate an automatic gain control (AGC) loop 66. It is desirable to employ a gain controlled amplifier such as 60 since the signal from the pickup circuits may vary from about 50 millivolts to about 1.2 volts as a result of a number of factors. Thus, the D.C. component or slowly varying component at the output of 64 is used to control the gain of amplifier 60.

The signal from amplifier 60 is then provided to a peak detector 68. The output signal from the peak detector provides a measure of the recovered signal plus any incidental AM plus any extraneous interfering signals. This peak detected signal is provided to the output circuits 70.

Also shown in FIG. 2 is a sync separator or stripper circuit 72 which responds to the demodulated video on line 25 to provide a pulse during the horizontal sync interval. Again, due to the format of the present system the sync tip level normally provides the largest amplitude level of the deviated 5 MHz video carrier. When the sync pulse appears at the sync separator 72 and is detected, a clamp circuit 74 is made operative and a point in the output circuits 70 is clamped to a given voltage level, typically ground level. The sync level is also appearing at the input to the output circuit 70 at the same time that sync is available at the sync separator 72. When the clamp is released there is a sudden change in voltage in the output circuits which approximately corresponds to the voltage level which defines the given sync pulse. The output circuits 70 have now been conditioned to provide an output signal to the OR circuit (or to the defect switch 28) only when the peak detected signal has an amplitude greater than a certain level which is related to the voltage level corresponding to sync. In this way, the voltage level or detector threshold for responding to extraneous pulses is continuously updated and referenced to the last detected sync pulse. Thus, the RFI circuit is used to respond to extraneous pulses which have levels higher than the sync pulse level while the detection threshold is set at a level which will react to even low level extraneous pulses but still not react to most of the incidental AM components.

Figure 3:
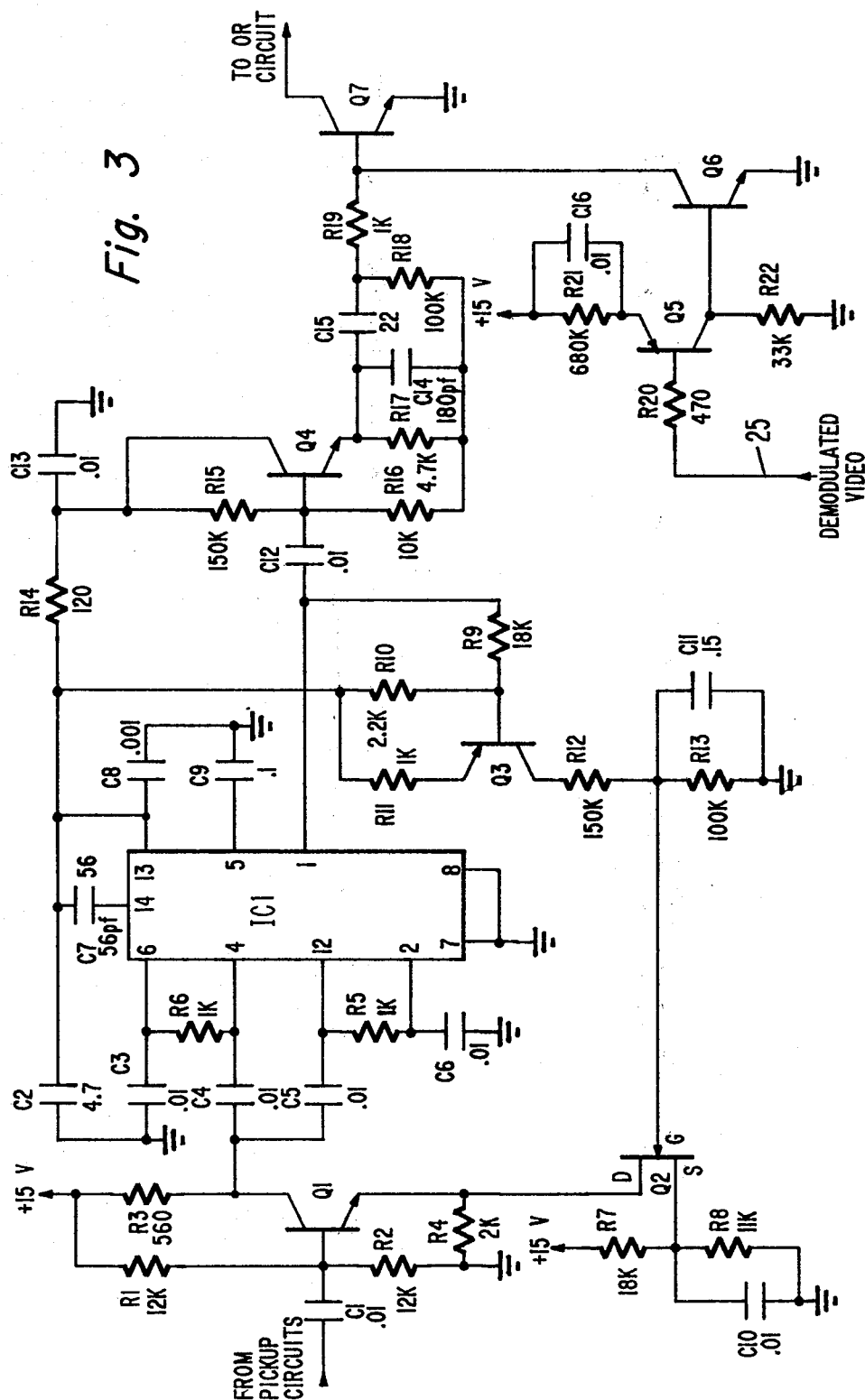
FIG. 3 is a schematic circuit diagram of the present invention.

A detailed schematic diagram of the RFI circuit 38 is shown in FIG. 3. The signal from the pickup circuits is coupled to amplifier transistor Q1 via capacitor C1. The amplified version of the recovered signal is provided from the collector electrode of Q1 to the input terminals of a synchronous detector, IC1, which is a CA2111 integrated circuit which includes the limiter and signal multiplier functions. The output signal from IC1 is provided at terminal 1.

The D.C. component of the signal at IC1 terminal 1 is used in the AGC amplifier Q3 to develop a signal at the collector electrode thereof which supplies the gate electrode of FET Q2. The drain electrode of Q2 is connected to the emitter electrode of transistor Q1. When the D.C. component at terminal 1 of IC1 rises in level, the impedance presented across the drain to source electrodes of Q2 increases and thus the gain of the amplifier including Q1 decreases. In this way, the signal level at terminal 1 of IC1 can be kept at a fairly constant level from the long term average point of view despite normally anticipated variations in signal level recovered from the disc.

The output signal of the product generator or synchronous detector IC1 is AC coupled via capacitor C12 to a peak detector circuit which includes transistor Q4. The peak detected signal is coupled via a large capacitor, C15 at 22 microfarads, and resistor R19 to the base electrode of an output transistor Q7.

The demodulated video, which includes luminance, chrominance and synchronization signals, on line 25 is coupled to a sync separator circuit which includes transistor Q5. A pulse representing the horizontal synchronization pulse interval is available at the collector electrode of transistor Q5. This pulse signal is provided to the base electrode of clamping transistor Q6. When transistor Q6 is turned on, its collector electrode, which is connected to the base electrode of transistor Q7, is placed at a reference level, such as ground if the saturation voltage between the collector to emitter electrodes of Q6 is ignored.

The operation of the circuitry shown in FIG. 3 is as follows. The recovered signal is amplified by Q1 and applied to the limiter/synchronous detector IC1. The output of IC1, at pin 1, includes all the components previously mentioned. The D.C. component is used to control the AGC loop. The peak detector Q4 rectifies the A.C. interference component and provides inverted video and positive going pulses representing interference.

The sync separator, including Q5, detects the horizontal sync pulses present in the demodulated video. Transistor Q6 is turned on during these sync pulse intervals and clamps the detected signal to ground (substantially). At this time the detector side of the large capacitor C15 rises to substantially the full voltage level associated with the sync tip level of that particular sync pulse. At the end of the sync pulse interval, the voltage on the detector side of capacitor C15 falls suddenly to whatever the video level happens to be. When this happens, the voltage at the base electrode of transistor Q7 suddenly drops by an equal amount (the base electrode is now unclamped at the end of the sync pulse interval). Now in order to activate transistor Q7, any pulse from any extraneous source has to exceed that sync tip level drop plus the Vbe of transistor Q7. When this happens, a signal is sent out on the collector of Q7 to the OR circuit and the detect switch is operated to permit signal substitution for as long as the collector of Q7 indicates the presence of an extraneous pulse in the recovered signal.

Thus, it can be seen that whatever voltage level the sync tip is at for a given sync pulse, that voltage level is related to the level at which transistor Q7 is activated. In this way, the threshold for detection is continuously updated for each sync pulse.

In the circuit of FIG. 3, since the output signal appears on the collector electrode of a transistor, i.e., a high output impedance, it is not necessary to use an actual OR gate to combine the RFI indication signal and the normal defect indication signal. In this case, as previously mentioned, a simple circuit point may be used to combine these signals and this circuit point is then connected to the defect switch 28.

In the circuit shown in FIG. 3 all resistor values are in ohms and all capacitor values are given in microfarads unless otherwise noted.

What is claimed is:
1. A video disc player of the type having:
pickup apparatus for recovering an information signal including synchronization signals recorded on a disc in the form of a modulated carrier; demodulation apparatus for demodulating the recovered signal; defect detection apparatus for detecting defects in the recovered signal; and defect compensating apparatus for providing a substitute signal in the playback display of said recovered signals during occurrences of defects in the recovered signal; said player being subject to interference with normal playback display operations due to the pickup of unrecorded, externally applied signals; apparatus for reducing the influence of said external signals comprising:
amplifier means connected to said pickup apparatus;
signal limiter means responsive to the signals provided by said amplifier means to provide an amplitude limited output signal;
product generator means responsive to the signals from said amplifier means and to said limited output signal for providing a signal corresponding to the product of the signals applied thereto;
signal detector means responsive to the product signal generated for detecting the amplitude of the product signal;
signal output means responsive to said detected output signal;
signal clamping means responsive to said recovered synchronization signals and connected to said signal output means to condition said signal output means to provide an output signal only when said detected signal exceeds an amplitude level related to the amplitude of the recovered signal during the occurrence of said synchronization signal; and
means for providing the output signal from said output means to said player defect compensation apparatus.
2. The apparatus according to claim 1 wherein said signal detector means comprises a peak detector circuit.
3. The apparatus according to claim 2 wherein said output circuit means comprises:
a capacitor having first and second terminals, one terminal being connected to said peak detector;
an output transistor having a collector electrode for providing a signal indicative of the presence of extraneous signals in the rcovered signal; said second terminal of said capacitor being connected to the base electrode of said output transistor; and
said signal clamping means being connected to the base electrode of said output transistor.
4. The apparatus according to claim 3 further comprising a sync separator responsive to the demodulated recovered signal for providing a signal to said clamping means for the duration of the recovered synchronization signal, said clamping means being responsive to the operation of said sync separator for clamping the base electrode of said output transistor at a certain voltage level for the duration of said recovered synchronization signal.
5. A video disc player of the type having:
pickup apparatus for recovering an information signal recorded on a disc in the form of a modulated carrier including synchronization signals; demodulation apparatus for demodulating the recovered signal; defect detection apparatus for detecting defects in the recovered signal; and defect compensation apparatus for providing a substitute signal in the playback display of said recovered signals during occurrences of defects in the recovered signal; said player being subject to interference with normal playback display operations due to the pickup of unrecorded, externally applied signals; apparatus for reducing the influence of said external signals comprising:
an amplifier responsive to said recovered information signal;
signal limiter means responsive to the signals provided by said amplifier for providing an amplitude limited version of said recovered information signal;
synchronous detector means responsive to the signals provided by said amplifier and to said limited version signal for providing an output signal corresponding to the product of the signals applied thereto;

automatic gain control means responsive to said synchronous detector output signal and connected to said amplifier for controlling the gain of said amplifier;

a peak detector circuit means AC coupled to said synchronous detector means;

an output circuit comprising a capacitor having one terminal connected to said peak detector and another terminal connected to the base electrode of an output transistor, the collector electrode of said output transistor being connected to said defect compensation apparatus;

a sync separator circuit coupled to and responsive to the output signals of said demodulation apparatus for providing a separated synchronization signal during the time of occurrence of said synchronization signals;

a clamp circuit comprising a transistor having a base electrode connected to an output of said sync separator circuit, a collector electrode connected to the base electrode of said output transistor and an emitter electrode connected to a point of reference potential, said clamp circuit operating in response to the occurrence of said separated synchronization signals for clamping the base electrode of said output transistor at a certain potential for the duration of said synchronization signals;

said output circuit being conditioned to provide a signal at the collector electrode of said output transistor when the signal provided by the peak detector circuit means exceeds a voltage level larger than and related to the voltage level of the recovered signal during the occurrence of the synchronization signal.

6. An apparatus for recovering information signals including periodically recurring synchronization signals, said information signals beinhg subject to interference from extraneous signals with, an extraneous signal threshold detector comprising:

first means responsive to said recovered information signals for providing a signal corresponding to the amplitude of said information signals;

output circuit means responsive to said signal provided by said first means for providing an output signal indication when said extraneous signal exceeds a threshold amplitude level;

second means responsive to said synchronization signals for conditioning said output circuit means to provide said output signal indication when said extraneous signals exceed said threshold amplitude level, said threshold amplitude level being directly related to the amplitude of the recovered signal during the occurrence of said synchronization signals, and being periodically modified in accordance with the amplitude of said synchronization signals as said synchronization signals periodically recur.

* * * * *